United States Patent [19]

Alberti

[11] Patent Number: 5,595,143
[45] Date of Patent: Jan. 21, 1997

[54] RETRACTABLE LEASH APPARATUS PROVIDING FOR DOUBLING THE RANGE AND RETRACTION SPEED OF SUCH APPARATUS WITHOUT TENSION INCREASE

[76] Inventor: Frank Alberti, P.O. Box 99155, Seattle, Wash. 98199

[21] Appl. No.: 545,566

[22] Filed: Oct. 19, 1995

[51] Int. Cl.$^6$ .................................................. A01K 27/00
[52] U.S. Cl. ........................................ 119/794; 119/796
[58] Field of Search ................................... 119/794, 795, 119/796, 908, 770

[56] References Cited

U.S. PATENT DOCUMENTS

| | | | |
|---|---|---|---|
| 2,889,807 | 6/1959 | Beebe | 119/794 |
| 3,088,438 | 5/1963 | Oliphant | 119/770 |
| 3,315,642 | 4/1967 | Rogers et al. | 119/796 |
| 4,977,860 | 12/1990 | Harwell | 119/794 |
| 5,377,626 | 1/1995 | Kilsby et al. | 119/796 |
| 5,483,926 | 1/1996 | Bogdahn | 119/796 |

*Primary Examiner*—Robert P. Swiatek
*Assistant Examiner*—Yvonne R. Abbott
*Attorney, Agent, or Firm*—Robert W. Jenny

[57] ABSTRACT

The leash apparatus includes two commercially available self retracting leashes, one carried in a pack carried on the leashed animal and the other carried by the user. Each leash has a button which, when the button is pushed, locks the leash line reel in the leash. The button on the user held leash is manually operated. The button on the animal carried leash is operated by remote control. A transmitter operated by the user sends a signal to a receiver/relay in the pack. The receiver/relay switches on power from a battery in the pack to a solenoid which activates the button. The transmitter may be attached to the user held leash such that it is operated when the reel-locking button on that leash is pushed, providing automatic simultaneous locking of both reels. Using two leashes inherently doubles the leash length and overall retraction speed with no change in range of tension in the leash line. In an alternate embodiment the transmitter/ receiver relay equipment has two channels, individually operable. The second channel provides an audio signal to provide for stopping a dog trained to stop at the signal, thus in many instances avoiding the stress and exertion involved in stopping the dog by locking the reels.

6 Claims, 1 Drawing Sheet

RETRACTABLE LEASH APPARATUS PROVIDING FOR DOUBLING THE RANGE AND RETRACTION SPEED OF SUCH APPARATUS WITHOUT TENSION INCREASE

BACKGROUND OF THE INVENTION

1. Field

The subject invention is in the field of lanyards, tethers and leashes, particularly leashes. Also, it is in the field of self retractable tapes and leashes. Specifically, it is in the field of retractable leashes and, more specifically, self retractable leashes for large, fast dogs.

2. Prior Art

The prior art in this specific field and known to the inventor of the subject invention is a commercially available retractable leash which has a casing including a hand grip and enclosing a reel for a line which is the leash line. A spring causes the reel to wind the line in when tension in the line allows. A button convenient to the holder's thumb is depressed to engage teeth on the spring powered reel to, when desired, prevent it from turning. The leash is available in a range of sizes and a range of leash line lengths for each size.

Such leashes are highly useful in communities in which the law requires that dogs be on a leash when not on the owner's property or otherwise confined. The leashes allow the dogs the freedom provided by a long leash and eliminate the need for the user to repeatedly handle the leash line, pulling it in to prevent it from becoming entangled with the dogs legs, trees, bushes, etc. and alternately letting it out again. The reel locking feature provides the control needed to limit the range when necessary.

It is generally recognized that the larger the dog, the longer the leash line required to take optimum advantage of the automatic rewinding leash. For optimum use it is also required that the rewinding speed be faster in proportion to increase of dog size since the speeds of dogs are generally related to their sizes. For a range of tension in the line comfortable for the user, the two requirements noted above are technically incompatible. The longer the line, the more mass there is to be accelerated by the reel spring when the leash is shortened and therefore the more tension needed to achieve a given retraction speed. With higher speed retraction it is also necessary that the acceleration to that speed be increased. The formula showing the relationship among force (tension), mass and acceleration is $F=ma$ in which F is the tension, m is the mass of the line and a is the acceleration possible under the circumstances. The expression for a from this equation is $a=F/m$. From this equation it can be seen that acceleration decreases with increases in the mass, i.e. increases in the length of the line. To double the retraction speed using one reel and spring the spring force (tension) would have to be increased four times, two to handle the doubled mass and two to double the acceleration needed to reach the doubled speed.

The subject invention addresses the need for increasing both the range and the retraction speed of leash apparatus for animals relative to the tension level in the leash line. The primary objective of the subject invention is to meet this requirement. A second objective is that the equipment used in meeting the requirement be such that the cost of the leash apparatus would not inhibit its use.

SUMMARY OF THE INVENTION

The subject invention is leash apparatus providing for doubling the range and retraction speed of such apparatus without increasing the tension levels in the leash line.

The apparatus comprises two commercially available retractable leashes connected in series, i.e. end-to-end. The commercially available leash comprises a case having a handle, a reel in the case, a line carried on the reel and extending through an opening in the case and connected to a hook at the free end of the line and a spring in the case which applies torque to the reel such that the reel winds in the line when the torque can overcome the tension in the line. The apparatus further comprises a button which, when pressed, causes the reel to be prevented from rotating, thus limiting the extension of the line as well as preventing its retraction.

In the subject invention the hooks of two of the commercially available leashes are connected and one of the leashes is held by the user and the other is carried in a pack attached to the dog by an appropriate harness. A solenoid in the pack operates the button of the leash carried by the dog and the solenoid operation is controlled by a receiver/relay which in turn responds to a signal from a transmitter operated by the user. A battery pack is included in the pack and the receiver/relay responds to a signal from the transmitter by sending power from the battery pack to the solenoid.

It is inherent in the use of the two commercially available leashes as described that the overall leash length is double that of a single leash and, since two reels operate simultaneously to retract the line, that the retraction speed of the subject apparatus is double that of a single leash. Also, the line tension in the subject apparatus is not increased over the line tension in each of the commercially available leashes. To limit extension or retraction of the lines the user presses the button of the leash being held and also uses the transmitter to send a signal to the receiver/relay in the pack, thus operating the button of the dog-carried leash. The transmitter can be attached to the hand carried leash and mechanism provided such that the button on the hand held leash and the transmitter are operated simultaneously. The mechanism is such that it may be disengaged when independent operation of the two leashes is desired. A transmitter and receiver suited to the subject invention are available from a company named Mytek America. The transmitter model number is D4A-1 and the receiver/relay is designated SS-065.

These particular units have two channels. The transmitter has two operating buttons, one for each channel. In the receiver relay one channel functions with the reel and, in an alternate embodiment of the subject invention, the second channel sends power from the battery to an audio signal generator. The signal frequency is above the hearing frequency range for humans and in the range for dogs. In use, the dog is trained to stop when it hears the signal and can generally be stopped by providing the stop signal using the second channel. Stopping by signal is preferred because it doesn't involve the stress, exertion and shock loading of stopping the dog by locking the reels. However, the stopping by locking the reels is very useful in emergencies and/or when the dog fails to heed the signal.

The subject invention is described in more detail below with reference to the attached drawings.

DETAILED DESCRIPTION OF THE INVENTION

Figures 1, 2:
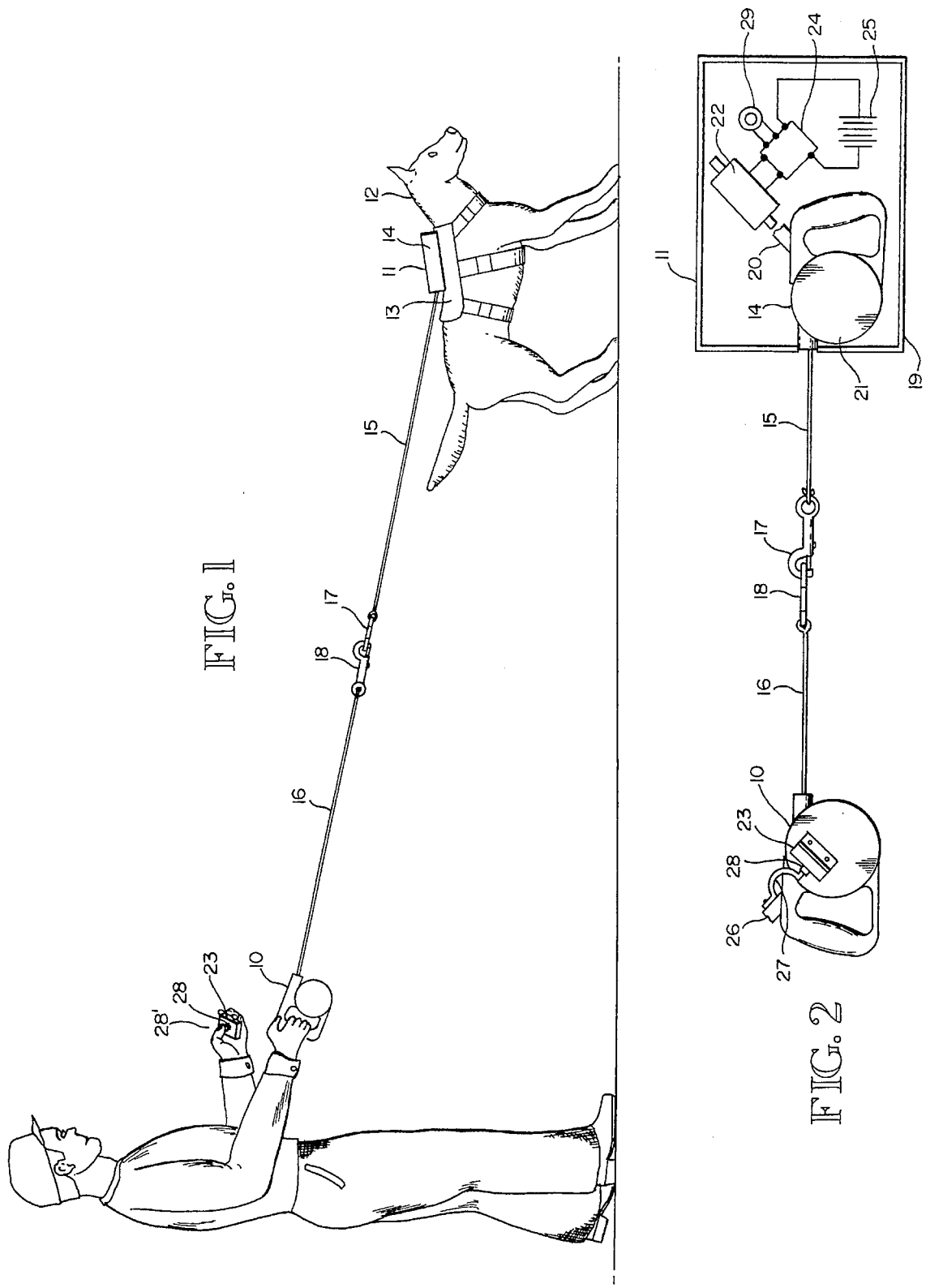
FIG. 1 illustrates the subject invention in use.
FIG. 2 is a schematic diagram of the subject invention.

The subject invention is a retractable leash apparatus providing for doubling the range and retraction speed of such apparatus without increasing the levels of tension in the leash line. As shown in FIG. 1, the leash apparatus comprises one commercially available retractable leash 10 and a pack 11 attached to dog 12 by saddle 13. A second commercially available retractable leash 14 (not visible in this illustration) is contained in the pack and the leash line 15 from that leash is attached to the leash line 16 of leash 10 by hook 17 attached to free end of line 15 and hook 18 attached to the free end of line 16.

FIG. 2 is a schematic diagram of the subject invention with elements numbered in FIG. 1 like numbered in FIG. 2. Leash 14 is mounted in case 19 of pack 11. Depressing button 20 on leash 14 prevents the spring powered reel 21 (not visible) in the leash from turning. Solenoid 22 is positioned to push the button and is activated when a signal generated by transmitter 23 is received by receiver/relay 24. The received signal activates the relay to supply power from battery 25 to the solenoid. It is operated by pushing button 26. The transmitter may be held in the user's hand or may be attached to leash 10. If the transmitter is attached to the leash, the button is pushed by bracket 27 attached to button 28 on leash 10. The bracket is resilient to allow for difference in the amounts of motion of the button on the leash and the button 29 of the transmitter. With this arrangement pushing button 28 locks the reel in both leashes. The bracket is pivotally attached so that it can be disengaged if desired.

In an alternate embodiment of the subject invention the transmitter/receiver relay equipment has two channels. The transmitter in this embodiment has a second button 28' (not shown) and the pack includes an audio signal generator 29, controlled by the receiver relay and powered through the relay by the battery.

It is considered to be understandable from this description that the subject invention meets its objectives. With two leash lines connected to each other the overall length is doubled. With two reels functioning simultaneously the retraction rate is doubled. Also, the tension range in the lines is not increased. Also, since the major components of the apparatus are commercially available and already in mass production the costs of the components and, accordingly, the subject apparatus are such that they will not inhibit sale and use of the apparatus.

It is also considered to be understood that while certain embodiments of the subject invention are described herein, other embodiments and modifications of those described are possible within the scope of the invention which is limited only by the attached claims.

I claim:

1. A retractable leash apparatus for use by a user for restraining an animal, said leash apparatus comprising:

a pack, first and second retractable leashes and means for attaching said pack onto said animal, said first retractable leash comprising a first spring powered reel, a first leash line carried on said first reel and having a first free end and a first hook attached to said first free end, said first reel creating a tension in said first leash capable of line, said second retractable leash comprising a second spring powered reel, a second leash line carried on said second reel and having a second free end and a second hook attached to said second free end, said second reel creating a tension in said second leash line, said first retractable leash being carried in said pack and said second retractable leash being held by said user with said first hook being connected to said second hook, whereby with said pack attached onto said animal said user can restrain said animal and the length and retraction speed of said leash apparatus are double the length and retraction speed of each of said first and second leashes with said tensions in said first and second leash lines being unchanged.

2. The apparatus of claim 1 in which said first leash further comprises a first button for locking said first reel and said second leash further comprises a second button for locking said second reel, said apparatus further comprising disengageable means for remote operation of said first button by said user, said second button being manually operable.

3. The apparatus of claim 2 further comprising means for operating said means for remote operation when said second button is operated.

4. The apparatus of claim 3 further comprising means for providing a signal audible to said animal.

5. The apparatus of claim 2 further comprising means for providing a signal audible to said animal.

6. The apparatus of claim 1 further comprising means for providing a signal audible to said animal.

* * * * *